US012636999B2

(12) United States Patent
Xie

(10) Patent No.: US 12,636,999 B2
(45) Date of Patent: May 26, 2026

(54) INTELLIGENT WARNING METHOD, SYSTEM AND INTELLIGENT TAILLIGHT DEVICE BASED ON MOTOR VEHICLE TAILLIGHT

(71) Applicant: SHENZHEN AURORA TECHNOLOGY LIMITED, Shenzhen (CN)

(72) Inventor: Qingbo Xie, Shenzhen (CN)

(73) Assignee: SHENZHEN AURORA TECHNOLOGY LIMITED, Shenzhen (CN)

( * ) Notice: Subject to any disclaimer, the term of this patent is extended or adjusted under 35 U.S.C. 154(b) by 12 days.

(21) Appl. No.: 19/023,138

(22) Filed: Jan. 15, 2025

(65) Prior Publication Data

US 2025/0381911 A1 Dec. 18, 2025

(30) Foreign Application Priority Data

Jun. 12, 2024 (CN) ......................... 202410751892.2

(51) Int. Cl.
*B60Q 1/50* (2006.01)
*B60Q 1/54* (2006.01)

(52) U.S. Cl.
CPC ............... *B60Q 1/508* (2022.05); *B60Q 1/54* (2013.01); *B60Q 2400/20* (2013.01); *B60Q 2400/50* (2013.01)

(58) Field of Classification Search
CPC ...... B60Q 1/508; B60Q 1/54; B60Q 2400/20; B60Q 2400/50

(Continued)

(56) References Cited

U.S. PATENT DOCUMENTS

2008/0129544 A1* 6/2008 Augst ................ B62D 15/0285 340/932.2
2018/0004020 A1* 1/2018 Kunii .................. B60Q 1/0017
(Continued)

FOREIGN PATENT DOCUMENTS

CN 209409901 U 9/2019
CN 214028420 U 8/2021
(Continued)

OTHER PUBLICATIONS

First Office Action issued in counterpart Chinese Patent Application No. 202410751892.2, dated Nov. 18, 2024.
(Continued)

*Primary Examiner* — Naomi J Small
(74) *Attorney, Agent, or Firm* — Westbridge IP LLC

(57) ABSTRACT

Disclosed are an intelligent warning method, an intelligent warning system, and an intelligent taillight device based on motor vehicle taillights. The method includes: monitoring, in real-time, a current speed of a motor vehicle, a speed of a leading vehicle, and a speed of a following vehicle, and providing feedback to a preset main control module; acquiring, through the main control module, a real-time distance between the motor vehicle and the following vehicle to obtain a following vehicle distance, and a real-time distance between the motor vehicle and the leading vehicle to obtain and a leading vehicle distance; controlling, by the main control module, a first projection module integrated in the motor vehicle taillight and a second projection module installed at a rear of the motor vehicle to project on a road surface in response to that a preset projection condition is met.

10 Claims, 4 Drawing Sheets

(58) Field of Classification Search
USPC .......................................................... 340/464
See application file for complete search history.

(56) References Cited

U.S. PATENT DOCUMENTS

| | | | | |
|---|---|---|---|---|
| 2023/0264624 | A1* | 8/2023 | Yasuda | B60Q 9/00 701/70 |
| 2024/0005795 | A1* | 1/2024 | Jiang | H04N 9/3194 |
| 2024/0010122 | A1 | 1/2024 | Nagata | |

FOREIGN PATENT DOCUMENTS

| | | | |
|---|---|---|---|
| CN | 115450524 | A | 12/2022 |
| DE | 102021130835 | A1 | 5/2023 |

OTHER PUBLICATIONS

Notification to Grant Patent Right for Invention issued in counterpart Chinese Patent Application No. 202410751892.2, dated Jan. 6, 2025.

* cited by examiner monitoring, in real-time, a current speed of a motor vehicle, a speed of a leading vehicle, and a speed of a following vehicle, and providing feedback to a preset main control module;
acquiring, through the main control module, a real-time distance between the motor vehicle and the following vehicle to obtain a following vehicle distance, and a real-time distance between the motor vehicle and the leading vehicle to obtain and a leading vehicle distance — 101 controlling, by the main control module, a first projection module integrated in the motor vehicle taillight and a second projection module installed at a rear of the motor vehicle to project on a road surface in response to that a preset projection condition is met;
adjusting projection ranges of the first projection module and the second projection module in real-time according to the following vehicle distance, so that there is always a distance between the projection range and the following vehicle, and the following vehicle is capable of observe the projection content — 102 acquiring, through the image acquisition module, the road surface image of the rear of the motor vehicle, and extracting and contrasting, through the main control module, the information in the image to detect whether there is a projection and whether the projection is correct. The projection content can be monitored through the rear camera — 103

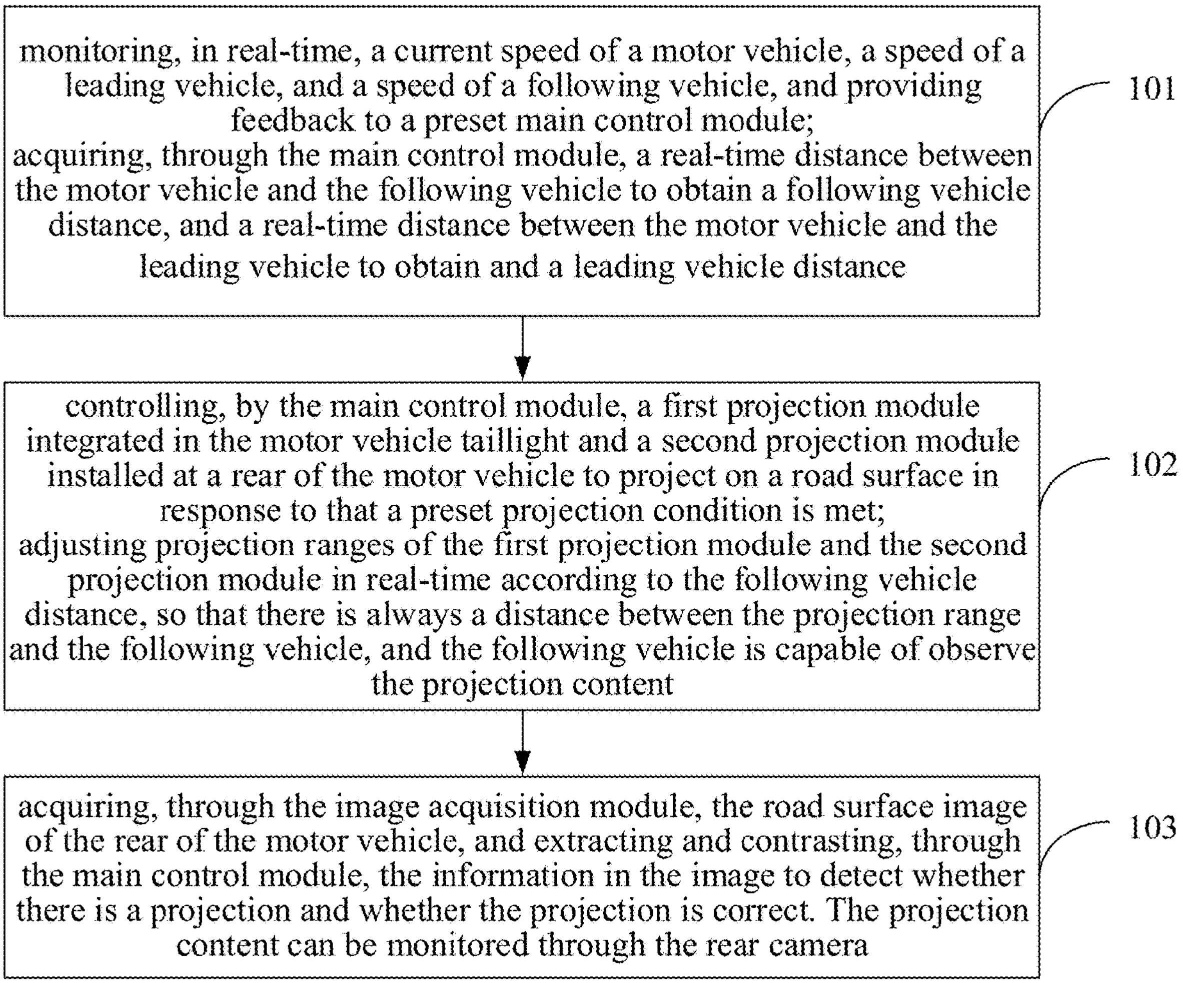

FIG. 1

INTELLIGENT WARNING METHOD, SYSTEM AND INTELLIGENT TAILLIGHT DEVICE BASED ON MOTOR VEHICLE TAILLIGHT

CROSS-REFERENCE TO RELATED APPLICATIONS

This application claims priority to Chinese Patent Application No. 202410751892.2, filed on Jun. 12, 2024, the entire contents of which are incorporated herein by reference.

TECHNICAL FIELD

The present application relates to the technical field of taillight warning, and in particular to an intelligent warning method, an intelligent warning system and an intelligent taillight device based on motor vehicle taillights.

BACKGROUND

Taillights, as an indispensable safety component of motor vehicles, play a vital role. They not only provide necessary lighting to ensure the visibility of vehicles at night or in poor visibility conditions, but also convey key driving intentions and status information to traffic participants behind through different functions such as brake lights, turn signals, and reversing lights, effectively preventing rear-end collisions and other road hazards. However, although the existing automotive taillight system plays an important role in ensuring basic driving safety, its functional design is often relatively simple, mainly focusing on basic signal transmission, and failing to fully utilize the potential of modern technology to provide a richer and more interactive communication method.

Most existing taillight technologies are limited to fixed-mode lighting displays, such as simple switch control, preset flashing frequencies, and fixed pattern displays, and lack the ability to dynamically adjust according to actual road conditions. This means that in complex and changing traffic environments, they may not fully meet the needs of efficient and detailed communication between drivers and pedestrians, and between vehicles.

With the development of autonomous driving technology and the rise of intelligent connected cars, vehicles, as mobile nodes in the "Internet of Things", should have stronger environmental perception and information exchange capabilities. However, most of the current taillight systems fail to deeply integrate with external data sources such as on-board sensors, and cannot make good use of real-time road conditions, weather conditions and driver behavior data, which limits their development in improving road safety, promoting traffic flow and enhancing the human-vehicle interaction experience.

SUMMARY

Based on the problems existing in the related art, the present application provides an intelligent warning method, an intelligent warning system and an intelligent taillight device based on the taillights of motor vehicles. The specific solutions are described as follows.

In a first part, the present application provides an intelligent warning method based on the motor vehicle taillight, which is applied to a motor vehicle integrated with an intelligent taillight device. The intelligent warning method includes the following:

monitoring, in real-time, a current speed of a motor vehicle, a speed of a leading vehicle, and a speed of a following vehicle, and providing feedback to a preset main control module;

acquiring, through the main control module, a real-time distance between the motor vehicle and the following vehicle to obtain a following vehicle distance, and a real-time distance between the motor vehicle and the leading vehicle to obtain and a leading vehicle distance;

controlling, by the main control module, a first projection module integrated in the motor vehicle taillight and a second projection module installed at a rear of the motor vehicle to project on a road surface in response to that a preset projection condition is met;

controlling the first projection module to project on the road surface and projecting first information, including the current speed of the motor vehicle, the speed of the following vehicle, and the following vehicle distance, as projection content to provide a warning to the following vehicle in response to that the following vehicle distance is within a preset projection distance;

controlling the second projection module to project on the road surface and projecting second information, including the current speed of the motor vehicle, the leading vehicle distance, and the speed of the leading vehicle, as projection content to provide a warning to the following vehicle and provide a driving status of the leading vehicle to the following vehicle in response to that the leading vehicle distance is less than a preset safety distance; and adjusting projection ranges of the first projection module and the second projection module in real-time according to the following vehicle distance, so that there is always a distance between the projection range and the following vehicle, and the following vehicle is capable of observe the projection content.

In an embodiment, the method further includes:

selecting, through the main control module, a projection mode to allow the first projection module and the second projection module to project the projection content according to the projection mode; and adjusting the projection mode in real-time during projection, where the projection mode includes projection color, projection brightness, projection content format, projection area, and projection duration.

In an embodiment, the method further includes:

obtaining, at intervals, a road surface image of the motor vehicle on a current road and providing feedback to the main control module;

processing, by the main control module, the road surface image through a pre-trained deep neural network to parse road surface information, including road surface flatness, road surface color, road surface water, and ambient brightness; and in response to that the current road surface is determined to be suitable for projection based on the road surface information and preset weather information, determining that the projection condition is met and selecting the projection mode.

In an embodiment, selecting the projection color based on the road surface color and referencing the ambient brightness to ensure a clear contrast between a color of the projection content and a color of the road surface under the ambient brightness; and selecting the projection content format and projection area based on the following vehicle distance, where a larger following vehicle distance corresponds to a larger projection area and a larger proportion of the projection content within the projection area to allow the following vehicle to obtain the projection content within the projection area.

In an embodiment, the first projection module and/or the second projection module includes a plurality of sub-projection modules capable of independent projection, the sub-projection modules are arranged in sequence from bottom to top, and projection power increases in sequence.

In an embodiment, a projection distance from a rear of the motor vehicle toward the following vehicle is divided into a first range, a second range, and a third range in sequence, the first range, the second range, and the third range decrease in sequence and are away from the motor vehicle in sequence; and the main control module is configured to control a projection area of each sub-projection module to partially or completely overlap with the third range and partially or completely be independent of the second range.

In an embodiment, the method further includes:

in response to that the following vehicle is within the second range, increasing the projection content, or enlarging the projection content format; and controlling, by the main control module, each sub-projection module to project within the first range, where projection areas of each sub-projection module overlap at most partially to cover an entire first range; and where a projection area corresponding to a sub-projection module with smaller projection power is closer to the rear of the motor vehicle.

In an embodiment, the method further includes:

in response to that the following vehicle is within the third range, reducing the projection content, or reducing the projection content format, and controlling, by the main control module, each sub-projection module to project within the second range, where projection areas of each sub-projection module overlap to enhance projection effects within the second range; and where at least part of the sub-projection modules project the same content, or at least part of the sub-projection modules project different content in a high-power mode.

In a second part, the present application provides an intelligent warning system based on the motor vehicle taillight, which is applied to a motor vehicle integrated with an intelligent taillight device. The intelligent warning system includes the following:

a detection unit, configured to:

monitor, in real-time, a current speed of a motor vehicle, a speed of a leading vehicle, and a speed of a following vehicle, and providing feedback to a preset main control module; and acquire, through the main control module, a real-time distance between the motor vehicle and the following vehicle to obtain a following vehicle distance, and a real-time distance between the motor vehicle and the leading vehicle to obtain and a leading vehicle distance; and a projection unit, configured to:

control, through the main control module, a first projection module integrated in the motor vehicle taillight and a second projection module installed at a rear of the motor vehicle to project on a road surface in response to that a preset projection condition is met;

control the first projection module to project on the road surface and projecting first information, including the current speed of the motor vehicle, the speed of the following vehicle, and the following vehicle distance, as projection content to provide a warning to the following vehicle in response to that the following vehicle distance is within a preset projection distance; and control the second projection module to project on the road surface and projecting second information, including the current speed of the motor vehicle, the leading vehicle distance, and the speed of the leading vehicle, as projection content to provide a warning to the following vehicle and provide a driving status of the leading vehicle to the following vehicle in response to that the leading vehicle distance is less than a preset safety distance; and adjust projection ranges of the first projection module and the second projection module in real-time according to the following vehicle distance, so that there is always a distance between the projection range and the following vehicle, and the following vehicle is capable of observe the projection content.

In a third part, the present application provides an intelligent taillight device of a vehicle, which is used to implement an intelligent warning method based on a motor vehicle taillight as described above.

In an embodiment, the intelligent taillight device includes:

a main control module;

a detection module;

two first projection modules integrated in the motor vehicle taillight; and a second projection module detachably connected to a rear of the motor vehicle, where the second projection module is provided at a centerline of the two first projection modules;

the main control module is communicatively connected to the detection module, the first projection modules, and the second projection module respectively;

the detection module includes at least a vehicle speed detection module and an image acquisition module; and the first projection modules and the second projection module are provided with digital micromirror devices.

In an embodiment, the intelligent taillight device further includes:

a display module provided at an area of a left and right taillight, an area between the left and right taillight, an entire area through the left and right taillight, or any combination of the above, where the display module is communicatively connected to the main control module, and configured to display the first information, and/or the second information, and/or rescue information, and/or road condition information ahead, and/or a custom interactive language.

Beneficial effects: the present application provides an intelligent warning method, an intelligent warning system and an intelligent taillight device based on motor vehicle taillights, which can provide warnings to the following vehicles through highly intelligent taillight design and projection mode to display driving status information in all directions, convey and analyze speed information and distance information between vehicles in real time, and enrich the functionality of taillights in warning. The projection module is used as a medium to deeply integrate the taillight system with external data sources such as on-board sensors, fully analyze real-time road conditions, weather conditions and driver behavior data to obtain projection content, which is of great significance in improving road safety, promoting traffic flow and enhancing the human-vehicle interaction experience, and greatly enhances road safety and driving experience.

In order to make the above-mentioned objects, features and advantages of the present application more obvious and easier to understand, preferred embodiments are specifically cited below and described in detail with reference to the attached drawings.

BRIEF DESCRIPTION OF THE DRAWINGS

In order to more clearly illustrate the technical solutions in the embodiments of the present application or in the related art, drawings used in the embodiments or in the related art will be briefly described below. Obviously, the drawings in the following description are only some embodiments of the present application. It will be apparent to those skilled in the art that other figures can be obtained according to the structures shown in the drawings without creative work.

FIG. 1 is a schematic diagram of an intelligent warning method of the present application.

The realization of the purposes, functional features and advantages of the present application will be further explained with reference to the accompanying drawings in combination with the embodiments.

DETAILED DESCRIPTION OF THE EMBODIMENTS

The technical solutions in the embodiments of the present application will be clearly and completely described below with reference to the drawings in the embodiments of the present application. Obviously, the described embodiments are only a part of the embodiments of the present application and not all of them. Based on the embodiments in the present application, all other embodiments obtained by those skilled in the art without creative efforts fall within the protection scope of the present application.

Figure 2:
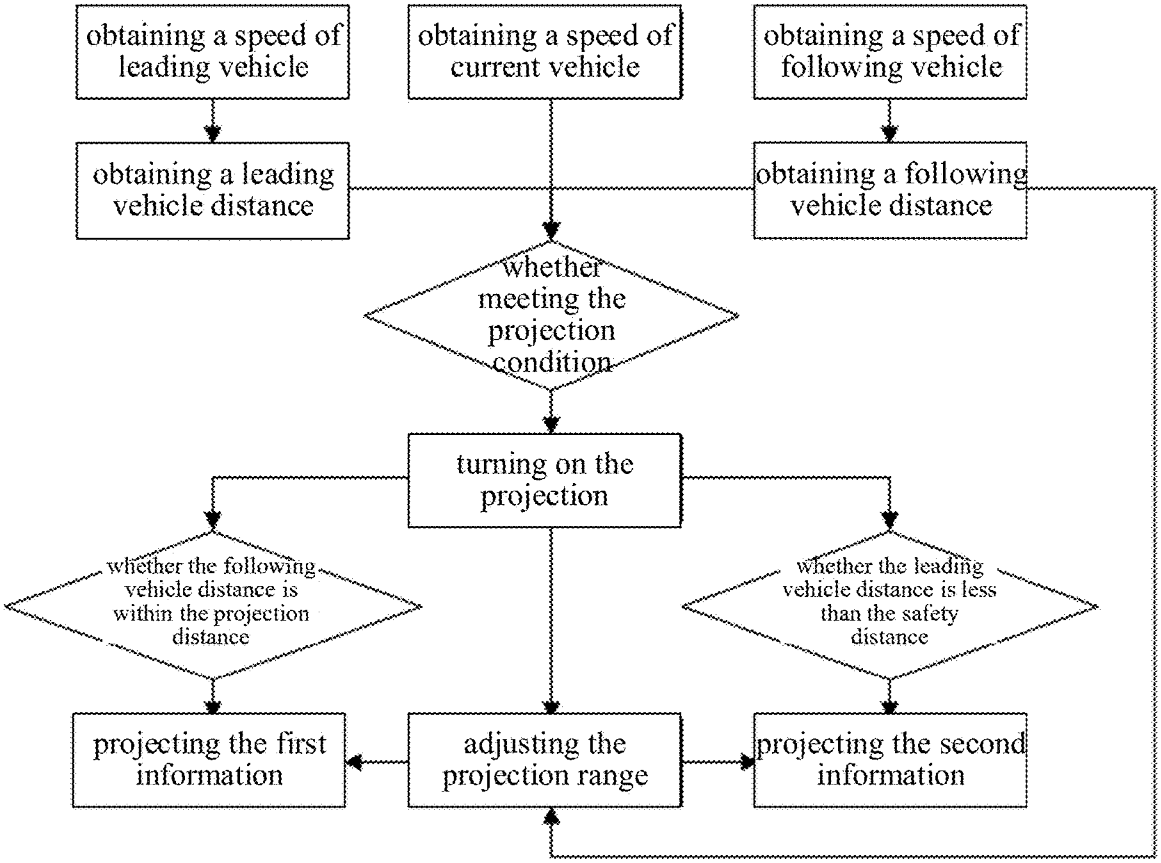
FIG. 2 is a schematic diagram of a principle of the intelligent warning method of the present application.

The present application provides an intelligent warning method based on the taillights of motor vehicles. Through the highly intelligent design of the taillights of automobiles, the driving status information is displayed in all directions to provide warnings for the following vehicles, and the speed information of the leading and following vehicles and the distance between them are conveyed in real time, which greatly enhances road safety and driving experience. The flow diagram of the intelligent warning method based on the taillights of motor vehicles is shown in FIG. 1, the principle is shown in FIG. 2, and the specific solution is as follows.

An intelligent warning method based on a motor vehicle taillight is applied to a motor vehicle integrated with an intelligent taillight device. The intelligent warning method includes the following:

101, monitoring, in real-time, a current speed of a motor vehicle, a speed of a leading vehicle, and a speed of a following vehicle, and providing feedback to a preset main control module;

acquiring, through the main control module, a real-time distance between the motor vehicle and the following vehicle to obtain a following vehicle distance, and a real-time distance between the motor vehicle and the leading vehicle to obtain and a leading vehicle distance;

102, controlling, by the main control module, a first projection module integrated in the motor vehicle taillight and a second projection module installed at a rear of the motor vehicle to project on a road surface in response to that a preset projection condition is met;

adjusting projection ranges of the first projection module and the second projection module in real-time according to the following vehicle distance, so that there is always a distance between the projection range and the following vehicle, and the following vehicle is capable of observe the projection content.

In an embodiment, the method further includes:

103, acquiring, through the image acquisition module, the road surface image of the rear of the motor vehicle, and extracting and contrasting, through the main control module, the information in the image to detect whether there is a projection and whether the projection is correct. The projection content can be monitored through the rear camera.

Figure 3:
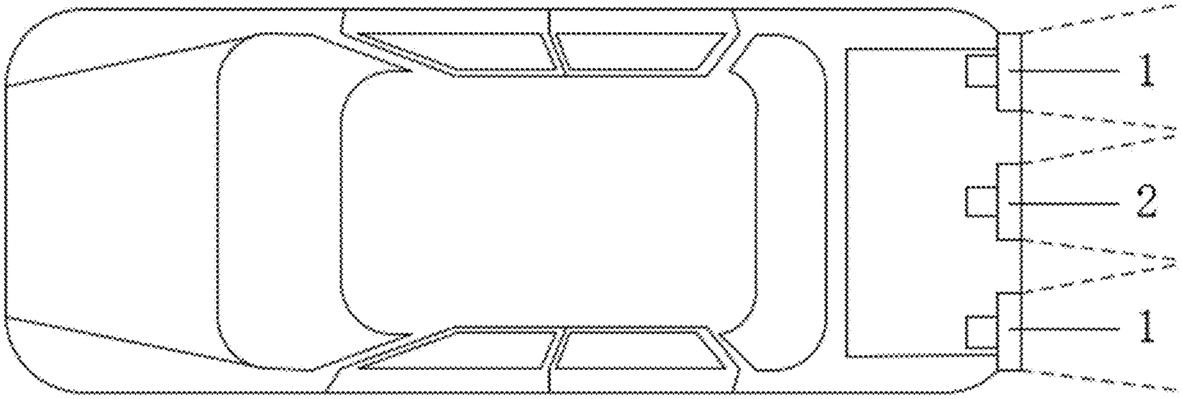
FIG. 3 is a schematic diagram of a position distribution of the intelligent taillight device of the present application.

The present application provides an intelligent warning method based on the motor vehicle taillight, which is aimed at a motor vehicle integrated with a specific intelligent taillight device. The intelligent taillight device includes two projection modules, namely a first projection module integrated in the motor vehicle taillight and a second projection module installed at the rear of the motor vehicle. The positions of the first projection module and the second projection module are shown in FIG. 3. The first projection module is inside the vehicle taillight and is integrated with the motor vehicle. The second projection module can be detachably connected to the motor vehicle, and the position of the second projection module can be adjusted as needed. In an embodiment, the second projection module is located on the central axis of the rear of the motor vehicle, which is also the centerline of the taillights on both sides, so that the projection areas between the first projection module and the second projection module do not conflict.

In the present application, the first projection module and the second projection module can display the speed of the vehicle, the speed of the leading vehicle, the speed of the following vehicle, the distance between the vehicle and the leading vehicle, and the distance between the vehicle and the following vehicle. In step 101, various vehicle speed data and distance data need to be obtained, which can be obtained according to existing various vehicle speed and distance measurement methods.

Regarding vehicle speed: for example, by using the front camera and the rear camera, the displacement of the leading vehicle and the following vehicle in the video frame sequence is analyzed through image recognition technology. Combined with the known video frame rate and vehicle size, the relative speed of the leading vehicle can be estimated. It is also possible to determine the relative speed of the leading vehicle and the following vehicle based on the Doppler effect by emitting radar waves and receiving reflected waves. The radar sensor on the vehicle continuously monitors the speed of the leading vehicle. In addition, speed detection can also be performed with the help of light detection and ranging (LiDAR), which can provide very accurate distance and speed measurements. By emitting laser pulses and analyzing the return time and waveform changes, the distance and relative speed to the leading vehicle and the following vehicle can be calculated.

Regarding vehicle distance, the distance between a motor vehicle and the leading vehicle is mainly determined by various sensors installed on the vehicle. These sensors measure the distance using different working principles and techniques. Some available measurement methods are as follows.

Millimeter-wave radar: radio waves (usually in the millimeter-wave frequency band) are used to transmit and receive reflected waves, and calculates the distance based on the round-trip time of the signal. Millimeter-wave radar can penetrate adverse weather conditions such as rain and fog, and is suitable for long-range and medium-range obstacle detection.

LiDAR: it accurately calculates the distance to the object in front by emitting laser pulses and measuring the return time of the reflected pulses. LiDAR provides high-precision three-dimensional spatial information and can depict the outline of the leading vehicle in detail, which is suitable for accurate distance measurement and shape recognition.

Camera: a single or multiple cameras are used for visual distance measurement. A single camera uses image processing technology to estimate the distance using the perspective principle and the known size of the object. A binocular camera uses the difference between two perspectives to calculate depth information through the triangulation principle to achieve more accurate distance measurement.

Ultrasonic sensor: it emits ultrasonic waves and receives echoes, and calculates the distance based on the propagation time and speed of the ultrasonic waves. Ultrasonic sensors are usually used for short-range measurement, such as detecting the distance to obstacles in parking assistance systems.

Considering the differences in urban development and road construction, it is necessary to determine whether projection can be performed and how to achieve better projection effects. Some roads, such as cement roads and dirt roads, have lighter road colors, and the projection effect is slightly worse than that of black asphalt roads. Some roads are bumpy and have poor flatness, which will cause distortion during projection, affecting the projection effect.

In an embodiment, the method further includes: selecting a projection mode through the main control module, so that the first projection module and the second projection module project the projection content according to the projection mode. During the projection process, the main control module adjusts the projection mode in real time. The projection mode includes projection color, projection brightness, format of projection content, projection area, and projection duration. The projection mode is usually preset, and which projection modules are turned on under different conditions, and the projection color, the projection brightness, the format of the projection content, the projection area, and the projection duration are selected.

Car taillights usually use three colors: yellow, red and white, and each color corresponds to a specific function (such as red for brake lights, yellow for turn signals, and white for reverse lights). When using projection technology, it is necessary to ensure that the projected color complies with traffic regulations, does not interfere with other road users, and the color should be clearly distinguishable. When changing the color of the taillight light source, ensure that the new color can maintain good visibility and legality in all weather and lighting conditions.

The projection brightness needs to be high enough to ensure that it is clearly visible during the day and at night, but not too dazzling to affect the drivers of the following vehicles. LED taillights are often used to increase brightness due to their high brightness and energy-saving characteristics. Too high brightness may cause glare and affect the safety of the vehicles behind, so it is necessary to comply with relevant regulations to limit the brightness.

Projected content includes warning signs, direction instructions, distance prompts and other information, which should be concise and easy to understand. Use standardized graphics or symbols to ensure universality and avoid cultural misunderstandings. Projected content should follow the specifications of road traffic signs and signals to avoid confusion.

The projection area should be set on or near the ground behind the vehicle to ensure that the relevant information of the projection content has a certain reference value to the vehicles behind, without distracting the driver's attention. The projection should not exceed the range of the vehicle too much to avoid interfering with adjacent lanes. Ensure that the projection area will not change misleadingly due to the driving status of the vehicle (such as sudden braking, turning).

The duration of the projection can correspond to the function of the taillight, for example, the brake light will light up immediately when the brake is pressed and turn off when it is released. Dynamic projection (such as turn indicators) can be synchronized with the operation and disappear in time after the operation is completed. The timing control of dynamic projection should be precise to avoid visual fatigue or misunderstanding caused by long-term projection.

The present application provides two projection modes, which use the vehicle distance as the dividing standard, and are respectively applicable to the projection situations when the vehicle distance is close and the vehicle distance is far. In practical applications, a range can be pre-defined as a measurement indicator of the vehicle distance.

First mode: when the following vehicle distance is within the preset projection distance, the first projection module is controlled to project on the road surface, and the first information including the current vehicle speed, the speed of the following vehicle and the following vehicle distance is used as the projection content to provide a warning for the following vehicle. The projection brightness and projection color are adjusted according to the ambient brightness. The following vehicle distance is within the preset projection distance, which proves that the distance between the motor vehicle and the following vehicle meets the projection conditions. The projection distance is a range, including the minimum projection distance and the maximum projection distance. In practical applications, it can be set based on the maximum projection range and the minimum projection range of the projection module with the rear end of the car as the starting point. Only within the projection distance can it be guaranteed that there is a normal projection effect without affecting the driving of the following vehicle. When the motor vehicle is far away from the following vehicle, a larger projection content format and a longer projection area are selected, and the proportion of the font or pattern in the projection area is increased, and the projection time is appropriately extended. When the motor vehicle is close to the following vehicle, a smaller projection content format and a longer projection area are selected, and the proportion of the font or pattern in the projection area can be appropriately reduced to project more content, or the projection content can be reduced, and the projection time can be shortened to reduce the visual fatigue of the following vehicle driver.

Second mode: when the distance to the leading vehicle is less than the preset safety distance, the second projection module is controlled to project on the road surface, and the second information including the current vehicle speed, the distance to the leading vehicle and the speed of the leading vehicle is used as the projection content to provide a warning to the following vehicle, and at the same time provide the following vehicle with the driving status of the leading vehicle. The distance to the leading vehicle is less than the preset safety distance. At this time, the distance between the leading vehicle and the motor vehicle is reduced, and the speed of the motor vehicle is greater than the speed of the leading vehicle. It may be that there is congestion ahead, causing the speed of the leading vehicle to decrease. At this time, the projection at the rear of the car can remind the following vehicle that there may be a situation on the road ahead, which is convenient for the driver of the following vehicle to understand the dynamics of the leading vehicle in real time, and can greatly reduce rear-end collisions caused by mis determination. Through the projection of the taillights of the motor vehicle, the following vehicle knows the driving status of the leading vehicle, which increases information sharing and information interaction between vehicles, promotes non-verbal communication between drivers, helps to establish a more harmonious driving environment, and improves the level of road civilization.

The driver of the following vehicle can adjust his own speed according to the instantaneous speed of the leading vehicle and maintain a safe distance, especially in high-speed driving and emergency braking situations, so that the driver can react more quickly. The projection displays not only the speed of the vehicle, but also key information such as the distance between vehicles, which provides an additional warning mechanism for the driver. For example, when the distance to the leading vehicle is too close, the unique warning projection can immediately remind the following vehicle to maintain a safe distance, effectively preventing traffic accidents. The setting of the safe distance is mainly based on the type of road, and is dynamically adjusted based on multiple factors including vehicle speed, weather conditions, and road conditions. For example, on a highway, when the speed exceeds 100 kilometers per hour, the safe distance is recommended to be more than 100 meters, and the safe distance can be set to 100 meters. On urban roads, it is generally recommended to keep a distance of more than 20 meters from the leading vehicle, and the safe distance can be set to 20 meters. Because the road conditions on rural roads are complex and the visibility may be poor, it is recommended to maintain a longer safe distance than urban roads, depending on the speed and road conditions, and usually more reserved space is required to deal with emergencies. In rainy, snowy, foggy and other conditions with low visibility, the safe distance needs to be significantly increased regardless of the road.

The intelligent warning method of the present application can be adjusted dynamically in real time according to the driving conditions of the vehicle through the main control module. In an embodiment, the projection range of the first projection module and the second projection module is adjusted in real time according to the distance of the following vehicle, so that there is always a distance between the projection range and the following vehicle and the following vehicle can observe the projection content. In some embodiments, the projection area is divided into multiple sub-areas from the rear of the motor vehicle toward the following vehicle, and the first projection module and the second projection module can both project separately in each sub-area or project in a combination of multiple sub-areas. The division of the first projection module and the second projection module in the sub-area is the same or different. In an embodiment, a plurality of projection sub-modules may be provided on the first projection module and/or the second projection module, each projection sub-module is responsible for the projection of a sub-area, and the projection range can be changed by adjusting the operation of each projection sub-module. In an embodiment, the first projection module and/or the second projection module can be rotated on the motor vehicle, and the projection range is adjusted by the rotation angle.

Figure 4:
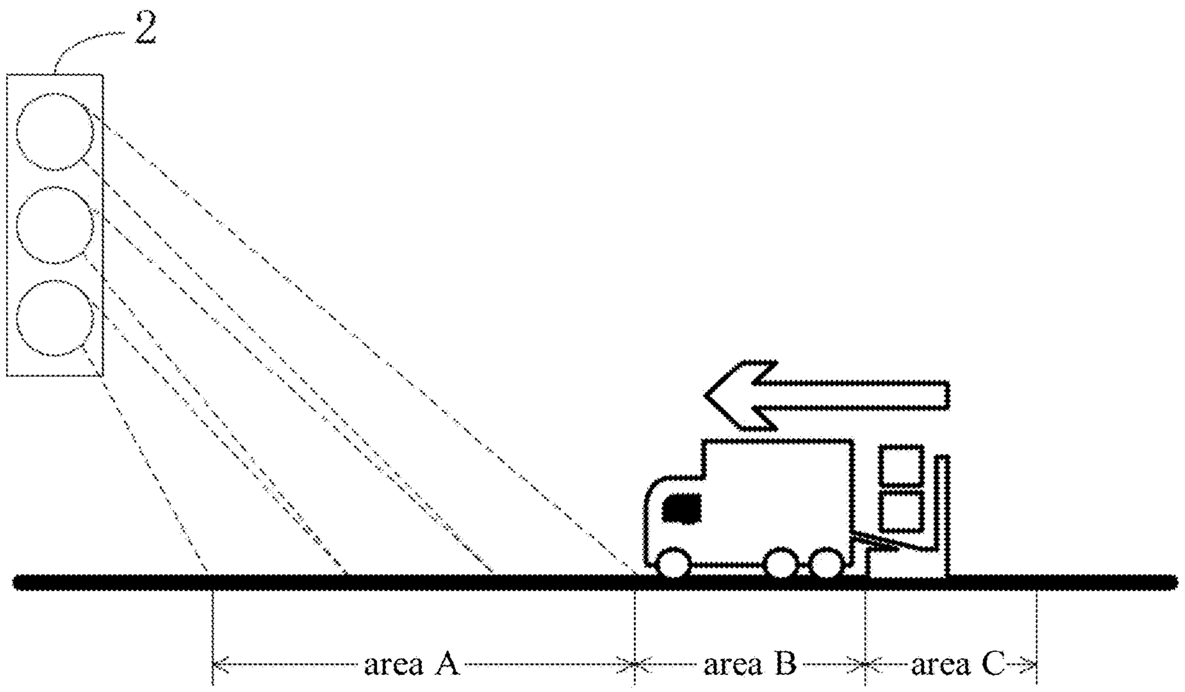
FIG. 4 is a schematic diagram of a projection mode of the present application.
Figure 5:
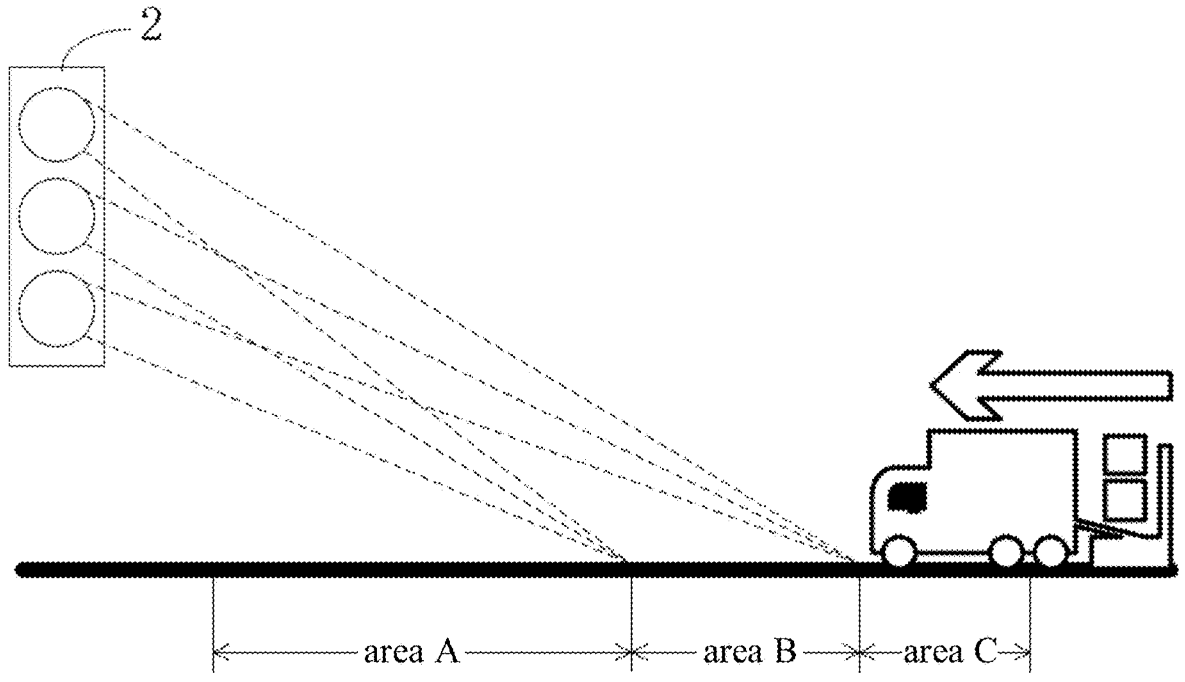
FIG. 5 is a schematic diagram of another projection mode of the present application.

In some embodiments, the first projection module and/or the second projection module includes a plurality of sub-projection modules capable of independent projection. The sub-projection modules are arranged in sequence from bottom to top, and the projection power increases in sequence. In an embodiment, the sub-projection modules in the first projection module and the second projection module are arranged in an array to form a projection matrix, and the main control module realizes projection of different areas by controlling the projection matrix. Each sub-projection module is an element in the projection matrix and can be projected independently. In FIG. 4 and FIG. 5, each projection module has three vertically distributed sub-projection modules, and the first projection module and the second projection module can construct a 3*3 projection matrix.

In an embodiment, the projection distance from the rear of the motor vehicle to the following vehicle is divided into the first range, the second range and the third range in sequence, and the first range, the second range and the third range are successively reduced and successively away from the motor vehicle. The projection area of each sub-projection module is controlled by the main control module to partially or completely overlap with the third range, and partially or completely independent of the second range. The projection distance of the rear of the motor vehicle is extended toward the following vehicle, and three ranges are divided. The demarcation of the range can be selected according to the maximum projection distance of the sub-projection module. In an embodiment, the dividing line between the second range and the third range is the maximum projection distance of the sub-projection module, and the dividing line between the first range and the second range is the maximum value of the projection distance of the sub-projection module. The first range and the second range represent two projection capabilities.

When the following vehicle is within the second range, the projection can be performed within the first range, as shown in FIG. 4. The first range is relatively large, and the projection content can be increased or the format of the projection content can be enlarged. The main control module controls each sub-projection module to perform projection within the first range, and the projection areas of each sub-projection module overlap at most to cover the entire first range. When projecting within the first range, the sub-projection module can project with a good effect without changing the projection mode. The projection area corresponding to the sub-projection module with smaller projection power is closer to the rear of the motor vehicle.

When the following vehicle is within the third range, the projection can be performed within the second range. If the projection is performed within the first range, the following vehicle may not be able to accurately obtain the projection content. However, the second range reflects the rated projection capacity of the sub-projection module. The projection effect in the second range may be poor, so the projection content and projection mode need to be adjusted. In an embodiment, the projection content is reduced or the format of the projection content is reduced. The main control module controls each sub-projection module to project separately within the second range, and the projection areas of each sub-projection module overlap to enhance the projection effect in the second range. The second range is smaller than the first range, so the projection content can be appropriately reduced, and the main warning content can be retained.

In an embodiment, in order to enhance the projection effect of the projection module in the second range, at least part of the sub-projection modules may have the same projection content, or at least part of the sub-projection modules may project different projection contents in a high power mode. When projecting distant areas, the projection color and brightness will become lighter. Multiple sub-projection modules project the same content in the same area, which can significantly enhance the projection effect and achieve the superposition of projection brightness and color. As shown in the FIG. 5, the projection content of each sub-projection module can also be reduced, so that each sub-projection module is only responsible for a small part of the projection content, and resources can be concentrated to project with better effects. In an embodiment, the projection content is divided into multiple parts according to the projection matrix, and each part is responsible for a sub-projection module. The sub-projection module can concentrate resources to project the corresponding content with higher power to improve the projection effect.

In some embodiments, the road surface image of the motor vehicle on the current road is obtained at intervals and fed back to the main control module. The main control module analyzes the road surface image through a pre-trained deep neural network, and analyzes the road surface information including road surface flatness, road surface color, road surface water and ambient brightness. The main control module determines whether the current road surface is suitable for projection based on the road surface information and preset weather information; if it is suitable to project, the projection mode is selected. The flatness, color, presence of water accumulation and ambient brightness of the road will affect the projection effect. Poor flatness, light road color, water accumulation on the road surface and excessive ambient brightness will all make the projection effect worse and affect the display of the projection content. Taking road surface water accumulation as an example, water accumulation is like a mirror, which will not only cause the projection light to scatter, making the originally clear projection pattern blurred, affecting the accurate interpretation of the information by the following vehicle, but also reflect the surrounding light sources, generate glare, interfere with the driver's visibility, and affect the observation of the projection content. In addition, light scattering will also reduce the contrast and color saturation of the projection, further reducing the recognizability of the projection content.

In the present application, a trained deep neural network model can be pre-built to analyze road images, identify road images and determine water accumulation, color, flatness and ambient brightness, providing important information for road maintenance, autonomous driving safety, etc. The training and construction process of the deep neural network model includes the following:

Data collection: first, a large number of road image samples need to be collected, covering road conditions under different conditions, including water accumulation, road surfaces of different colors and materials, surfaces of different flatness, and scenes under different lighting conditions.

Data annotation: each image is carefully annotated to indicate the water accumulation area, road color category, flatness level, ambient brightness, etc.

Preprocessing: the image is standardized, resized, and noise removed to make it suitable for input into the neural network.

Model selection: different deep learning architectures can be selected, such as convolutional neural networks (CNNs), which are widely used due to their excellent performance in image recognition tasks. For multi-task learning, a multi-output network can be designed, with each output corresponding to a determination target (water accumulation, color, flatness, brightness).

Feature extraction layer: the convolution layer and pooling layer of CNN are used to automatically extract image features, such as edges, textures, color distribution, etc.

Fully connected layer and output layer: used to map the extracted features to specific category determinations or numerical predictions, such as using SoftMax activation functions for classification tasks, or linear output layers for continuous value predictions (such as brightness estimation).

Dataset division: the dataset is divided into training set, validation set and test set to ensure the generalization ability of the model on unseen data.

Loss function and optimizer: a suitable loss function is selected according to the nature of the task (such as cross entropy loss for classification tasks and mean square error for regression tasks), and an optimizer (such as Adam) is configured to minimize the loss.

Training process: the model is iteratively trained on the training set, the performance is regularly evaluated on the validation set to avoid overfitting, and the network structure or training parameters are adjusted as needed.

Test set evaluation: finally, the performance of the model is evaluated on an independent test set, including indicators such as accuracy, recall rate, F1 score, etc.

Model optimization: the network structure is adjusted, data diversity is increased, data enhancement techniques and other methods are used to improve model performance based on the test results.

The settings for projection conditions include the following.

Road surface flatness: the road surface should be flat enough to ensure that the projected image is not distorted. If the road surface is uneven, it may cause the projection light to scatter or deform, affecting the clarity and readability of the information. The ideal road surface should meet certain flatness technical indicators, such as a low bumpiness index or a high flatness coefficient. In practical applications, international roughness index (IRI) can be used as a measurement indicator, which is calculated by measuring the vertical vibration caused by the uneven road surface when the vehicle is driving on the road surface. The smaller the IRI value, the smoother the road surface. For example, acceleration sensors or vibration sensors are installed on the vehicle, usually located on the chassis, seat position or near the wheels of the vehicle, to directly measure the vibration response of the vehicle. These sensors are able to capture three-dimensional vibration signals caused by uneven road surfaces, especially vibrations in the vertical direction.

Road color: the road color should provide enough contrast to the projection color so that the projected content stands out visually and is easily recognizable. Light road colors (such as cement gray) may be more suitable for dark projections, while dark road may require brighter projections. The consistency of road color is also important to avoid the projection information being difficult to recognize due to the road color variation. Based on the road color and reference to the ambient brightness, select the projection color to ensure that there is a clear contrast between the color of the projected content and the road color at that ambient brightness. For light road colors (such as off-white concrete), using a dark projection color (such as black or dark blue) can provide good contrast and make the projected content more vivid. On dark road (such as black asphalt), it is recommended to use a light projection color (such as white or yellow) to ensure the visibility of the projected image.

Ambient brightness: considering changes in ambient brightness, the brightness of the projection module should also be adjusted accordingly, such as reducing brightness at night or on cloudy days, and increasing brightness during the day or in strong light, to ensure that the information is clearly visible under any lighting conditions. The ambient brightness should be moderate, and too bright or too dark will affect the projection effect. During the day or in strong light environments, the projection needs to be bright enough to overcome the interference of background light. At night or in dim environments, although the projection is relatively easy to see, it is also necessary to avoid being too bright to cause glare and affect the vision of other drivers. Daytime or high-brightness environment: under strong light conditions, use brighter and more contrasting projection colors, or technology with enhanced color saturation to ensure that the image can be clearly seen in bright environments. It may be necessary to increase the projection brightness and choose projection colors that are bright and can effectively reflect light. Nighttime or low-brightness environment: in this case, avoid using too bright colors that are too glaring to avoid causing glare to disturb the driver. Appropriate brightness and contrast are selected to ensure that the projection is neither too abrupt nor too dim, while considering the level of light pollution in the surrounding environment.

Water accumulation: the road surface should be free of water or only slightly wet, because water accumulation will cause the projection light to scatter, affecting the image quality or even making it impossible to form an image. After rain or in a humid environment, it must be ensured that water accumulation does not cover the projection area, or the vehicle system can automatically identify water accumulation and adjust the projection strategy. Therefore, when it is determined that there is water accumulation on the road surface, projection will not be turned on.

In some embodiments, the format of the projection content and the projection area are selected based on the following vehicle distance, so that the greater the following vehicle distance, the larger the projection area, and the greater the proportion of the projection content in the projection area, so that the following vehicle can clearly obtain the projection content of the projection area. When the distance is close, only the most necessary warning or instruction information is displayed, and the content should be concise and easy to understand quickly. When the distance is far, more information can be displayed, such as navigation instructions, lane change warnings, etc., but attention should also be paid to the layout and design of the information to ensure that it does not distract attention. When the following vehicle is close to the boundary between the safe zone and the dangerous zone (such as about 5 meters away in the left side mirror), unnecessary projection should be reduced or stopped to prevent interference with the following vehicle.

In an embodiment, the projection brightness is adjusted according to the following vehicle distance. As the following vehicle distance decreases, the projection brightness is gradually reduced to avoid strong light directly hitting the eyes of the following vehicle driver. At the same time, the size of the projection is reduced to ensure that the information does not block the following vehicle's visibility. When the distance exceeds a certain safety threshold (such as more than 20 meters), the projection size and brightness can be appropriately increased to ensure the long-distance visibility of the information.

In an embodiment, the method further includes: based on the preset navigation module, real-time monitoring of whether the motor vehicle is turning, changing lanes or driving on a slope; if so, adjusting the projection content of the first projection module and the second projection module through the main control module to remind the driver of the following vehicle that the motor vehicle is turning, changing lanes or driving on a slope. For example, when the vehicle is about to turn or is turning, the ground projection indication of the turning direction is strengthened, such as increasing the length and width of the arrow or changing the color (such as using a more eye-catching yellow or red) to help the driver to clarify the turning path. The projection angle is dynamically adjusted according to the steering angle of the vehicle to ensure that the indication is always consistent with the direction of the vehicle's travel, helping the driver to predict the turning trajectory. When the vehicle is preparing to change lanes, a lane change warning sign is projected on the ground on the side of the vehicle to remind vehicles in adjacent lanes to pay attention to avoid. The projection is performed in a short time before and after the lane change action occurs, and is immediately weakened or turned off after the lane change is completed to avoid continuous interference to other vehicles. The front ramp information, including slope and length prompts, is projected on the straight section before the ramp to help the driver prepare in advance. When driving on ramps, the spacing of projected guide lines is adjusted according to the slope, the guide line spacing on steep slopes is shorten and the guide line spacing on flat sections is appropriately widen to help the driver keep the vehicle centered and stable.

In some embodiments, when there are multiple road images and the road surface flatness is lower than a preset flatness, it is determined that the current road surface has poor flatness and is not suitable for projection. When there are multiple continuous road images and the road surface color exceeds a preset proportion and is non-black, it is determined that the color of the current road is not suitable for projection. When there is water in multiple road images, it is determined that the current road is not suitable for projection. A high-resolution camera is selected and the camera is ensured to have good low-light performance so that clear images can be captured under different lighting conditions. Shooting in direct sunlight or against the light should be avoided, which will cause the image to be overexposed or underexposed, affecting the recognition accuracy. Cloudy days or using a polarizing filter can reduce reflections and improve image quality. For night shooting, sufficient lighting should be ensured, or professional low-light camera equipment should be used to capture road details. Maintaining consistency in shooting angle, height, and distance may facilitate subsequent image comparison and analysis. Recording the shooting time, location, and environmental conditions can provide a reference for data analysis.

Figure 6:
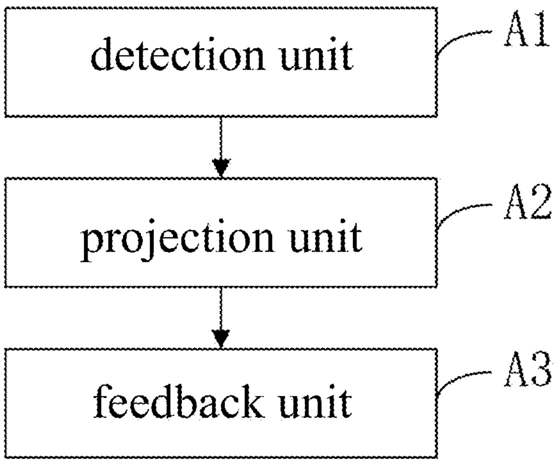
FIG. 6 is a schematic diagram of an intelligent warning system module of the present application.

The present application provides an intelligent warning system based on the motor vehicle taillight. The modules of the system are shown in FIG. 6 and are applied to a motor vehicle integrated with an intelligent taillight device. The intelligent warning system includes a detection unit A1, a projection unit A2, The detection unit A1 is configured to monitor, in real-time, a current speed of a motor vehicle, a speed of a leading vehicle, and a speed of a following vehicle, and providing feedback to a preset main control module; and acquire, through the main control module, a real-time distance between the motor vehicle and the following vehicle to obtain a following vehicle distance, and a real-time distance between the motor vehicle and the leading vehicle to obtain and a leading vehicle distance.

The projection unit A2 is configured to control, through the main control module, a first projection module integrated in the motor vehicle taillight and a second projection module installed at a rear of the motor vehicle to project on a road surface in response to that a preset projection condition is met; and control the first projection module to project on the road surface and projecting first information, comprising the current speed of the motor vehicle, the speed of the following vehicle, and the following vehicle distance, as projection content to provide a warning to the following vehicle in response to that the following vehicle distance is within a preset projection distance.

In some embodiments, the system further includes a feedback unit A3.

The feedback unit A3 is configured to obtain the road surface image of the rear of the motor vehicle through the image acquisition module, extract the information in the image through the main control module and compare it to detect whether there is a projection and whether the projection is correct.

Figure 7:
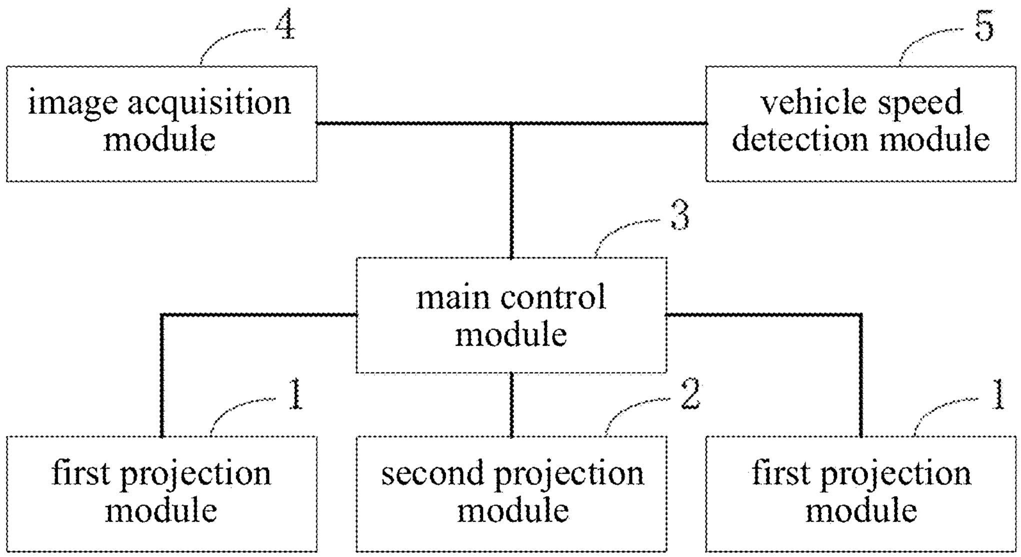
FIG. 7 is a schematic diagram of a module relationship of the intelligent taillight device of the present application.

The present application further provides an intelligent taillight device of a vehicle, which is used to implement an intelligent warning method based on a motor vehicle taillight according to the above embodiments. The connection relationship of each module in the intelligent taillight device is shown in FIG. 7. The specific solution is as follows.

An intelligent taillight device comprises a main control module, a detection module, two first projection modules integrated inside the taillight of a motor vehicle, and a second projection module detachably connected to the rear of the motor vehicle; the second projection module is provided at a centerline of the two first projection modules; the main control module is communicatively connected to the detection module, the first projection module and the second projection module respectively; and the detection module at least includes a vehicle speed detection module and an image acquisition module.

The first projection module and the second projection module are provided with digital micromirror devices, including lenses, prisms, optical fibers and other components, to ensure that the light is projected onto the ground at an accurate angle and intensity. The modules should be flexible enough to adjust the light path according to different projection contents. The first projection module is integrated inside the taillight group of the vehicle, and uses an LED light source in combination with a special optical lens or micromirror array to form the required light pattern. These lenses or micromirrors can accurately control the direction and distribution of the light so that the light is projected onto the ground according to a preset pattern. The light emitted by the light source (such as an LED) passes through a carefully designed lens system, and when the distance between the pattern or light source and the lens is appropriate, a clear and enlarged real image can be formed on the ground. By adjusting the distance between the pattern light sheet and the imaging lens, the size of the projected pattern can be controlled while ensuring that the focus of the image is clear. In an embodiment, the first projection module and the second projection module use a total internal reflection prism to guide the light, and the light is emitted at a specific angle through multiple reflections to achieve the enhancement and direction control of the light signal. This design can effectively utilize space, make the taillight volume more compact, and ensure the efficiency of light propagation.

In an embodiment, the main control module is communicatively connected to the auxiliary sensors for high and low beam lights, and/or laser radar, and/or ultrasonic sensor, and/or global positioning system (GPS) device on the motor vehicle. The main control module is connected to the vehicle network, and the data of various sensors are passed into the vehicle network and aggregated to the main control unit of the motor vehicle. The main control module can interact with the main control unit. Bluetooth, Wi-Fi or Internet of Vehicles technology can also be used to realize wireless transmission of sensor data to the main control module. This method requires the establishment of a stable wireless communication link between the vehicle and the projection system, and ensures the security and real-time nature of the data.

In some embodiments, the intelligent taillight device further includes a display module, which is provided at the left and right taillight areas, the area between the left and right taillights, the entire area from the left taillight to the right taillight, or a combination of any of the foregoing items. In an embodiment, the display module can be located below the taillights, in the area between the taillights, or across the entire rear of the car, extending from one taillight to the other, but cannot block the license plate. The display module is connected to the main control module for communication, and is used to display the first information, and/or the second information, and/or the rescue information, and/or the road condition information ahead, and/or the custom interactive language. The display module can be implemented by using a high-density LED array or Mini LED, which can not only meet the basic lighting and signal requirements, but also be used for entertainment, interaction, welcoming, information transmission and safety warnings. A display screen can also be set directly at the taillight for display. Integrating a display module in the intelligent taillight can not only display traditional light signals, but also display dynamic images, text information, etc., thereby achieving richer visual effects and functions. In an embodiment, the display module can display content including turn instructions, brake warnings, emergency prompts, driving status information, personalized information, etc. In case of emergency braking or vehicle failure, specific emergency signs or texts, such as "STOP" and "SOS", can be displayed to remind surrounding vehicles to avoid. For example, the vehicle is charging (for electric vehicles), the automatic driving mode is activated, the cruise control status, etc., can be conveyed to other road users through icons or short texts. The content allows car owners to set personalized greetings, holiday wishes, etc. to increase fun and interactivity, but it must be used without affecting traffic safety. Dynamic, highly recognizable displays can attract the attention of rear drivers more quickly, reduce rear-end collisions, and improve driving safety. In addition, directly conveying the vehicle status through images and text is more direct and effective than traditional lights, providing a new dimension for vehicle information communication.

The present application provides an intelligent warning method, an intelligent warning and an intelligent taillight device based on motor vehicle taillights, which can provide warnings to the following vehicles through highly intelligent taillight design and projection mode to display driving status information in all directions, convey and analyze speed and distance information between vehicles in real time, and enrich the functionality of taillights in warning. The projection module is used as a medium to deeply integrate the taillight system with external data sources such as on-board sensors, fully analyze real-time road conditions, weather conditions and driver behavior data to obtain projection content, which is of great significance in improving road safety, promoting traffic flow and enhancing the human-vehicle interaction experience, and greatly enhances road safety and driving experience.

Those skilled in the art should understand that the modules of the present application described above can be implemented by a general-purpose computing system, they can be concentrated on a single computing system, or distributed on a network composed of multiple computing system. In addition, they can be implemented by program codes executable by a computer system, so that they can be stored in a storage system and executed by the computing system, or they can be made into individual integrated circuit modules, or multiple modules or steps therein can be made into a single integrated circuit module for implementation. Thus, the present application is not limited to any specific combination of hardware and software.

Note that the above are only some embodiments of the present application and the technical principles used. Those skilled in the art will understand that the present application is not limited to the specific embodiments herein, and that various obvious changes, readjustments and substitutions can be made by those skilled in the art without departing from the scope of protection of the present application. Therefore, although the present application is described in more detail through the above embodiments, the present application is not limited to the above embodiments, and may include more other equivalent embodiments without departing from the concept of the present application, and the scope of the present application is determined by the scope of the appended claims.

The above descriptions are only some embodiments of the present application. However, the present application is not limited thereto, and any changes that can be conceived by those skilled in the art should fall within the scope of protection of the present application.

What is claimed is:

1. An intelligent warning method based on a motor vehicle taillight, applied to a motor vehicle integrated with an intelligent taillight, comprising:

monitoring, in real-time, a current speed of a motor vehicle, a speed of a leading vehicle, and a speed of a following vehicle, and providing feedback to a preset main control module;

acquiring, through the main control module, a real-time distance between the motor vehicle and the following vehicle to obtain a following vehicle distance, and a real-time distance between the motor vehicle and the leading vehicle to obtain and a leading vehicle distance;

controlling, by the main control module, a first projection module integrated in the motor vehicle taillight and a second projection module installed at a rear of the motor vehicle to project on a road surface in response to that a preset projection condition is met;

controlling the first projection module to project on the road surface and projecting first information, comprising the current speed of the motor vehicle, the speed of the following vehicle, and the following vehicle distance, as projection content to provide a warning to the following vehicle in response to that the following vehicle distance is within a preset projection distance;

controlling the second projection module to project on the road surface and projecting second information, comprising the current speed of the motor vehicle, the leading vehicle distance, and the speed of the leading vehicle, as projection content to provide a warning to the following vehicle and provide a driving status of the leading vehicle to the following vehicle in response to that the leading vehicle distance is less than a preset safety distance; and adjusting projection ranges of the first projection module and the second projection module in real-time according to the following vehicle distance, so that there is always a distance between the projection range and the following vehicle, and the following vehicle is capable of observe the projection content.

2. The method of claim 1, further comprising:

selecting, through the main control module, a projection mode to allow the first projection module and the second projection module to project the projection content according to the projection mode; and adjusting the projection mode in real-time during projection, wherein the projection mode comprises projection color, projection brightness, projection content format, projection area, and projection duration.

3. The method of claim 2, further comprising:

obtaining, at intervals, a road surface image of the motor vehicle on a current road and providing feedback to the main control module;

processing, by the main control module, the road surface image through a pre-trained deep neural network to parse road surface information, comprising road surface flatness, road surface color, road surface water, and ambient brightness; and in response to that the current road surface is determined to be suitable for projection based on the road surface information and preset weather information, determining that the projection condition is met and selecting the projection mode.

4. The method of claim 3, further comprising:

selecting the projection color based on the road surface color and referencing the ambient brightness to ensure a clear contrast between a color of the projection content and a color of the road surface under the ambient brightness; and selecting the projection content format and projection area based on the following vehicle distance, wherein a larger following vehicle distance corresponds to a larger projection area and a larger proportion of the projection content within the projection area to allow the following vehicle to obtain the projection content within the projection area.

5. The method of claim 1, wherein the first projection module and/or the second projection module comprises a plurality of sub-projection modules capable of independent projection, the sub-projection modules are arranged in sequence from bottom to top, and projection power increases in sequence;

a projection distance from a rear of the motor vehicle toward the following vehicle is divided into a first range, a second range, and a third range in sequence, the first range, the second range, and the third range decrease in sequence and are away from the motor vehicle in sequence; and the main control module is configured to control a projection area of each sub-projection module to partially or completely overlap with the third range and partially or completely be independent of the second range.

6. The method of claim 5, further comprising:

in response to that the following vehicle is within the second range, increasing the projection content, or enlarging the projection content format; and controlling, by the main control module, each sub-projection module to project within the first range, wherein projection areas of each sub-projection module overlap at most partially to cover an entire first range; and wherein a projection area corresponding to a sub-projection module with smaller projection power is closer to the rear of the motor vehicle.

7. The method of claim 5, further comprising:

in response to that the following vehicle is within the third range, reducing the projection content, or reducing the projection content format, and controlling, by the main control module, each sub-projection module to project within the second range, wherein projection areas of each sub-projection module overlap to enhance projection effects within the second range; and wherein at least part of the sub-projection modules project the same content, or at least part of the sub-projection modules project different content in a high-power mode.

8. An intelligent warning system based on a motor vehicle taillight, applied to a motor vehicle integrated with an intelligent taillight device, comprising:

a detection unit, configured to:

monitor, in real-time, a current speed of a motor vehicle, a speed of a leading vehicle, and a speed of a following vehicle, and providing feedback to a preset main control module; and acquire, through the main control module, a real-time distance between the motor vehicle and the following vehicle to obtain a following vehicle distance, and a real-time distance between the motor vehicle and the leading vehicle to obtain and a leading vehicle distance; and a projection unit, configured to:

control, through the main control module, a first projection module integrated in the motor vehicle taillight and a second projection module installed at a rear of the motor vehicle to project on a road surface in response to that a preset projection condition is met;

control the first projection module to project on the road surface and projecting first information, comprising the current speed of the motor vehicle, the speed of the following vehicle, and the following vehicle distance, as projection content to provide a warning to the following vehicle in response to that the following vehicle distance is within a preset projection distance;

control the second projection module to project on the road surface and projecting second information, comprising the current speed of the motor vehicle, the leading vehicle distance, and the speed of the leading vehicle, as projection content to provide a warning to the following vehicle and provide a driving status of the leading vehicle to the following vehicle in response to that the leading vehicle distance is less than a preset safety distance; and adjust projection ranges of the first projection module and the second projection module in real-time according to the following vehicle distance, so that there is always a distance between the projection range and the following vehicle, and the following vehicle is capable of observe the projection content.

9. An intelligent taillight device of a motor vehicle, configured to realize the method of claim 1, comprising:

a main control module;

a detection module;

two first projection modules integrated in the motor vehicle taillight; and a second projection module detachably connected to a rear of the motor vehicle, wherein the second projection module is provided at a centerline of the two first projection modules;

the main control module is communicatively connected to the detection module, the first projection modules, and the second projection module respectively;

the detection module comprises at least a vehicle speed detection module and an image acquisition module; and the first projection modules and the second projection module are provided with digital micromirror devices.

10. The device of claim 9, further comprising:

a display module provided at an area of a left and right taillight, an area between the left and right taillight, an entire area through the left and right taillight, or any combination of the above, wherein the display module is communicatively connected to the main control module, and configured to display the first information, and/or the second information, and/or rescue information, and/or road condition information ahead, and/or a custom interactive language.

* * * * *